United States Patent
Chatterjee et al.

(10) Patent No.: US 7,827,555 B2
(45) Date of Patent: *Nov. 2, 2010

(54) SCHEDULER FOR A MULTIPROCESSING COMPUTING SYSTEM

(75) Inventors: Mitrajit Chatterjee, Santa Clara, CA (US); Peter Zenon Onufryk, Flanders, NJ (US); Inna Levit, Sunnyvale, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1192 days.

This patent is subject to a terminal disclaimer.

(21) Appl. No.: 11/036,938

(22) Filed: Jan. 14, 2005

(65) Prior Publication Data
US 2006/0059487 A1    Mar. 16, 2006

Related U.S. Application Data

(63) Continuation-in-part of application No. 10/940,201, filed on Sep. 13, 2004.

(51) Int. Cl.
*G06F 9/46* (2006.01)
(52) U.S. Cl. .................. 718/103; 718/100; 718/102
(58) Field of Classification Search ........... 718/100, 718/102, 103
See application file for complete search history.

(56) References Cited

U.S. PATENT DOCUMENTS

| | | | |
|---|---|---|---|
| 4,612,418 A | 9/1986 | Takeda et al. | |
| 5,745,778 A | 4/1998 | Alferi | |
| 5,835,764 A | 11/1998 | Platt et al. | |
| 5,848,257 A | 12/1998 | Angle et al. | |
| 5,887,166 A | 3/1999 | Mallick et al. | |
| 5,913,925 A | 6/1999 | Kahle et al. | |
| 6,076,157 A | 6/2000 | Borkenhagen et al. | |
| 6,133,864 A | 10/2000 | Sabatini | |
| 6,308,279 B1 | 10/2001 | Toll et al. | |
| 6,378,125 B1 * | 4/2002 | Bates et al. ................. | 717/129 |
| 6,507,862 B1 | 1/2003 | Joy et al. | |

(Continued)

OTHER PUBLICATIONS

Ungerer, T. et al., "A survey of Processors with Explicit Multithreading," ACM Computing Surveys, March 2003, pp. 29-63, col. 35, No. 1.

(Continued)

*Primary Examiner*—Meng-Ai An
*Assistant Examiner*—Gregory A Kessler
(74) *Attorney, Agent, or Firm*—Kenneth Glass; Standley J. Pawlik; Glass & Associates

(57) ABSTRACT

A system and method for scheduling a thread identifies runnable threads based on precycle signals determined before the scheduling cycle. The thread indexes of the runnable threads are grouped according to the thread priorities of the runnable threads, and the thread indexes are ranked within each group. The runnable threads that will be runnable in the next scheduling cycle are identified based on same cycle signals determined during the scheduling cycle. The highest ranked thread index of the runnable threads that will also be runnable in the next scheduling cycle is selected as the scheduled thread. In another configuration, a round robin ranking and a priority ranking are determined for the thread indexes. The thread indexes are then ranked according to the round robin ranking and the priority ranking and the highest ranked thread index of a runnable thread is selected as the scheduled thread.

18 Claims, 6 Drawing Sheets

U.S. PATENT DOCUMENTS

| | | | |
|---|---|---|---|
| 6,633,897 B1 * | 10/2003 | Browning et al. | 718/103 |
| 6,697,935 B1 | 2/2004 | Borkenhagen et al. | |
| 6,785,889 B1 | 8/2004 | Williams | |
| 6,952,826 B1 | 10/2005 | Smyers et al. | |
| 6,965,986 B2 | 11/2005 | Kossman et al. | |
| 7,058,937 B2 | 6/2006 | Fu et al. | |
| 7,096,470 B2 * | 8/2006 | Brown et al. | 718/102 |
| 7,143,411 B2 | 11/2006 | Circenis et al. | |
| 7,320,065 B2 | 1/2008 | Gosior et al. | |
| 7,359,846 B1 | 4/2008 | Fernandez | |
| 2002/0161957 A1 | 10/2002 | Comeau et al. | |
| 2002/0174318 A1 | 11/2002 | Stuttard et al. | |
| 2004/0060052 A1 | 3/2004 | Brown et al. | |
| 2004/0187120 A1 | 9/2004 | Moore et al. | |
| 2004/0210697 A1 | 10/2004 | Quach et al. | |
| 2005/0149608 A1 * | 7/2005 | Sanjay | 709/200 |
| 2005/0149936 A1 * | 7/2005 | Pilkington | 718/102 |
| 2006/0059487 A1 | 3/2006 | Chatterjee et al. | |

OTHER PUBLICATIONS

Mazzucco, P., "Fundamentals of Multithreading," http://www.sicentral.com/articles/01/6/multithreading/print.php, posted Jun. 15, 2001.

Cranor, C. et al., "Arcitectural Considerations for CPU and Network Interface Integration," IEEE Micro, Jan.-Feb. 2000, pp. 18-26, IEEE.

Neihaus et al. "group scheduling in systems software" IEEE, Apr. 2004, pp. 1-8.

* cited by examiner

SCHEDULER FOR A MULTIPROCESSING COMPUTING SYSTEM

CROSS-REFERENCE TO RELATED APPLICATIONS

This application is a continuation-in-part of U.S. patent application Ser. No. 10/940,201, entitled "System and Method of Scheduling Computing Threads," filed Sep. 13, 2004, which is incorporated herein by reference.

BACKGROUND

1. Field of the Invention

The present invention relates generally to multithreaded computing systems and methods. More particularly, the present invention relates to systems and methods of scheduling computing threads for processing in a multithreaded computing system.

2. Background Art

One type of multithreaded computing system includes a thread scheduler that schedules computing threads. Once a thread is scheduled, an instruction of the scheduled thread can issue to a pipelined processor for processing. The pipelined processor includes a sequence of stages, each of which performs a different operation on an instruction as the instruction sequences through the stages. Moreover, the pipelined processor can process multiple instructions at the same time, each of the instructions being in a different stage.

Maintaining a high throughput of the pipelined processor in this type of computing system generally depends upon scheduling a runnable thread during a scheduling cycle, and issuing an instruction of the scheduled thread to the first stage of the pipelined processor during the next scheduling cycle. Stated differently, the throughput of the pipelined processor is generally higher when each stage of the pipelined processor contains an instruction.

In some multithreaded computing systems, a runnable thread may become unrunnable after the thread scheduler schedules the thread but before an instruction of the scheduled thread is issued to the pipelined processor. This can occur, for example, when a thread is scheduled during a scheduling cycle, and a previously issued instruction of that thread causes the computing system to initiate a thread context switch. The thread context switch occurs during the next scheduling cycle. During this next scheduling cycle, however, an additional instruction of the scheduled thread is not issued to the pipelined processor because the scheduled thread is now unrunnable. Instead, another runnable thread is scheduled during this next scheduling cycle, and an instruction of this other thread issues to the pipelined processor in the following scheduling cycle. Accordingly, no instruction is issued to the pipelined processor during the scheduling cycle in which the thread context switch occurs. Consequently, the first stage of the pipelined processor becomes empty and thus the throughput of the pipelined processor is diminished.

In light of the above, there exists a need to improve thread scheduling in a way that avoids empty stages in a pipelined processor.

SUMMARY OF THE INVENTION

A two-stage thread scheduler addresses the need to improve thread scheduling by avoiding empty stages from occurring in a pipelined processor. The first stage of the thread scheduler ranks thread indexes of threads that are runnable at the start of the scheduling cycle. During the scheduling cycle, the second stage of the thread scheduler selects the highest ranked thread index of the runnable thread that will be runnable during the next scheduling cycle. In this way, an instruction of the selected thread can issue to a pipelined processor during this next scheduling cycle, thus avoiding empty stages in the pipelined processor.

In one embodiment, the first stage of the thread scheduler determines both a round robin ranking and a priority ranking for thread indexes of computing threads. The second stage of the thread scheduler ranks the thread indexes such that the highest ranked thread indexes are ranked according to the round robin ranking and the remaining thread indexes are ranked according to the priority ranking. Further, the second stage of the thread scheduler identifies the thread index of any unrunnable thread and selects the highest ranked thread index other than a thread index of an unrunnable thread. The thread of the selected thread index will be runnable in the next scheduling cycle.

In one embodiment of a method in accordance with the present invention, a lead thread index of a runnable thread and an alternative thread index of another runnable thread are identified based on precycle signals. The lead thread index or the alternative thread index is then selected based on one or more same cycle signals determined during the scheduling cycle. The thread having the selected thread index is runnable during the next scheduling cycle.

In another embodiment of a method in accordance with the present invention, one or more runnable thread indexes are identified based on one or more precycle signals. Each of the runnable thread indexes identifies a thread being runnable at the start of a scheduling cycle. Each runnable thread index is ranked based on one or more precycle signals and a ranking algorithm. A highest ranked runnable thread index identifying a thread being runnable in a next scheduling cycle is selected based on one or more same cycle signals determined during the scheduling cycle.

In one embodiment of a system in accordance with the present invention, a thread ranking module identifies both a lead thread index of a runnable thread and an alternative thread index of another runnable thread based on precycle signals. A thread selector then selects either the lead thread index or the alternative thread index based on one or more same cycle signals determined during the scheduling cycle. The thread having the selected thread index is runnable during the next scheduling cycle.

In another embodiment of a system in accordance with the present invention, a runnable thread identification module identifies one or more runnable thread indexes based on one or more precycle signals. Each runnable thread index identifies a thread being runnable at the start of a scheduling cycle. A runnable thread ranking module ranks each runnable thread index based on one or more precycle signals and a ranking algorithm. A thread selector selects a highest ranked runnable thread index identifying a thread being runnable in a next scheduling cycle, based on one or more same cycle signal determined during the scheduling cycle.

In one embodiment of a computer program product in accordance with the present invention, the computer program product includes computer program code for identifying a lead thread index of a runnable thread based on precycle signals. The computer program product also includes computer program code for identifying an alternative thread index of another runnable thread based on the precycle signals. Additionally, the computer program product includes computer program code for selecting either the lead thread index or the alternative thread index during the scheduling cycle, based on one or more same cycle signals determined during the scheduling cycle. The thread having the selected thread index is runnable during the next scheduling cycle.

In a method of scheduling a thread of a plurality of threads, in accordance with one embodiment of the present invention, a priority ranking is determined for thread indexes of the threads according to the thread priorities of the threads. Further, a round robin ranking is determined for the thread indexes. The thread indexes are ranked based on the priority ranking and the round robin ranking such that the ranked thread indexes having the highest thread priority are ranked according to the round robin ranking and the remaining thread indexes are ranked according to the priority ranking. The thread index of any unrunnable thread is identified as an unrunnable thread index, and the highest ranked thread index that is not an unrunnable thread index is selected. In a further embodiment, a computer program product includes computer program code for performing the method.

A system for scheduling a thread of a plurality of threads, in accordance with one embodiment of the present invention, includes a priority ranking module, a round robin ranking module, a thread index ranking module, an unrunnable thread identification module, and a thread index selector. The priority ranking module is configured to determine a priority ranking for thread indexes of the threads according to thread priorities of the threads. The round robin ranking module is configured to determine a round robin ranking for the thread indexes. The thread index ranking module is configured to rank the thread indexes based on the priority ranking and the round robin ranking such that the ranked thread indexes having the highest thread priority are ranked according to the round robin ranking and the remaining thread indexes are ranked according to the priority ranking. The unrunnable thread identification module is configured to identify the thread index of any unrunnable thread as an unrunnable thread index. The thread index selector is configured to select the highest ranked thread index that is not an unrunnable thread index.

DETAILED DESCRIPTION OF THE EMBODIMENTS

In accordance with the present invention, a thread scheduler ranks thread indexes of threads that are runnable at the beginning of a scheduling cycle according to a thread selection scheme. One or more events that can occur during the scheduling cycle, however, can cause one or more of the runnable threads to be unrunnable in the next scheduling cycle. The thread scheduler selects the highest ranked thread index of a runnable thread that will be runnable in the next scheduling cycle.

Figure 1:
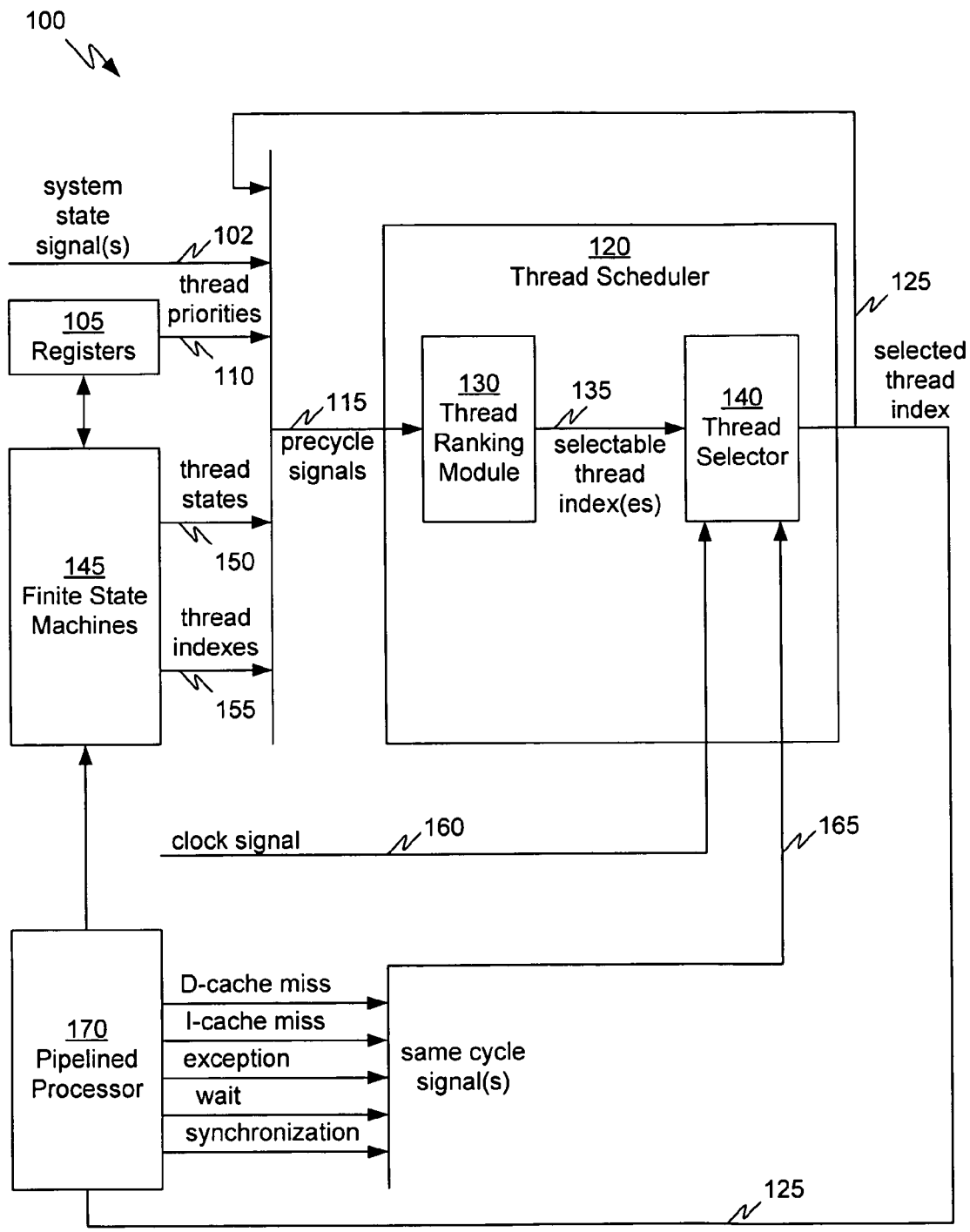
FIG. 1 is a block diagram of an exemplary computing environment in which a thread scheduler in accordance with the present invention can be practiced.

FIG. 1 depicts a block diagram of an exemplary computing environment 100 in which a thread scheduler 120 in accordance with the present invention can be practiced. The exemplary computing environment 100 includes registers 105, finite state machines 145, and a pipelined processor 170. The registers 105 store information for threads (i.e., computing threads) in the exemplary computing environment 100, as is described more fully herein. Each of the finite state machines 145 is dedicated to a thread (e.g., a hardware computing thread) and maintains the state of the thread. The thread scheduler 120 schedules threads and the pipelined processor 170 processes scheduled threads, as is described more fully herein. It is to be appreciated that the exemplary computing environment 100 can include other components, such as a memory system or a bus controller, as would be appreciated by one skilled in the art.

The thread scheduler 120 includes a thread ranking module 130 and a thread selector 140. The thread ranking module 130 identifies runnable threads (i.e., threads in a runnable state) and ranks the thread indexes 155 of the runnable threads to generate selectable thread index(es) 135 based on one or more precycle signals 115, as is described more fully herein. The thread selector 140 receives the selectable thread index(es) 135 from the thread ranking module 130 and selects one of the selectable thread index(es) 135 as a selected thread index 125 based on a clock signal 160 and one or more same cycle signal(s) 165, as is described more fully herein.

In one embodiment, the selected thread index 125 identifies a scheduled thread. In this embodiment, the thread scheduler 140 provides the selected thread index 125 to the pipelined processor 170. In turn, the pipelined processor 170 processes thread instructions of the thread identified by the selected thread index 125.

In one embodiment, the thread ranking module 130 is a hardware module. In another embodiment, the thread selector 140 is a hardware module. Examples of a hardware module include a combinational logic circuit, a sequential logic circuit, a programmable logic device, and a computing device, among others.

In one embodiment, the thread ranking module 130 is a software module. In another embodiment, the thread selector 140 is a software module. Examples of a software module include a computer program, a software routine, binary code, and firmware, among others. Another example of a software module is a computer program product, such as a compact disc read-only memory (CD-ROM) or a memory storage device, containing computer program code.

In one embodiment, the thread ranking module 130 is a computing process that executes computer program code to generate the selectable thread index(es) 135 based on the precycle signals 115. In another embodiment, the thread selector 140 is a computing process that executes computer program code to select the selected thread index 125 based on the selectable thread index(es) 135, the clock signal 160, and the same cycle signal(s) 165.

In one embodiment, the registers 105 provide the precycle signals 115 to the thread ranking module 130. In this embodiment, the precycle signals 115 include thread priorities 110, thread states 150, and thread indexes 155 of threads in the computing environment 100. In a further embodiment, the precycle signals 115 also include the most recently selected thread index 125 (i.e., the currently selected thread index 125). In another embodiment, the registers 105 in combination with the finite state machines 145 provide the precycle signals to the thread ranking module 130. In this embodiment, the registers 105 provide the thread priorities 110 to the thread ranking module 130 and the finite state machines 145 provide the thread states 150 and the thread indexes 155 to the thread ranking module 130.

In another embodiment, the precycle signals 115 include one or more system state signal(s) 102, each of which indicates a system state of the computing environment 100 or the thread scheduler 120. For example, a system state signal 102 can indicate a hardware state of the thread scheduler 120, the finite state machines 145, or the pipelined processor 170. As a further example, the system state signal 102 can indicate whether the thread scheduler 120 has issued a selected thread index 125 to the pipelined processor 170 during a scheduling cycle or whether the pipelined processor 170 is stalled.

In another embodiment, a system state signal 102 can indicate a hardware state of a cache controller (not shown) or a bus controller (not shown) in the computing environment 100. For example, the system state signal 102 can be the value of a counter or a register in the bus controller (not shown), which indicates the status of the bus controller (e.g., busy).

The thread states 150 each indicate a state of one of the threads. In one embodiment, an instruction of a thread can be issued to the pipelined processor 170 when the thread state 150 of the thread is runnable. In this embodiment, an instruction of a thread is not issued to the pipelined processor 170 when the thread state 150 of the thread is unrunnable (e.g., disabled, suspended, or waiting).

In the exemplary computing environment 100, finite state machines 145, one for each thread, provide the thread states 150 of the threads to the thread ranking module 130. It is to be understood that another source can provide the thread states 150 to the thread ranking module 130. For example, the finite state machines 145 can provide the thread states 150 to the registers 105, and in turn the registers 105 can provide the thread states 150 to the thread ranking module 130.

The thread indexes 155 each identify a different thread that the pipelined processor 170 can process. In one embodiment, each of the thread indexes 155 identifies a different hardware thread. Although the finite state machines 145 provide the thread indexes 155 to the thread ranking module 130 in the exemplary computing environment 100, it is to be understood that another source can provide the thread indexes 155 to the thread ranking module 130. For example, the thread indexes 155 can be inherent in the thread priorities 110 or thread states 150, or both.

The thread priorities 110 each indicate a priority for processing a thread in the pipelined processor 170. In the exemplary computing environment 100, each of the threads in the exemplary computing environment 100 has a thread priority 110. Although the registers 105 provide the thread priorities 110 to the thread ranking module 130 in the exemplary computing environment 100, it is to be understood that another source can provide the thread priorities 110 to the thread ranking module 130.

The clock signal 160 establishes scheduling cycles for the thread scheduler 120. In one embodiment, the clock signal 160 establishes periodic scheduling cycles, as would be appreciated by one skilled in the art. In this embodiment, the thread scheduler 120 can generate a selected thread index 125 during each scheduling cycle.

The same cycle signal(s) 165 indicate events that can occur during a scheduling cycle to cause a thread to become unrunnable (e.g., cause the thread to transition from a runnable state to an unrunnable state). Examples of a same cycle signal 165 include a data cache (D-cache) miss, an instruction cache (I-cache) miss, and an instruction exception, which are generated by the pipelined processor 170. Other examples of a same cycle signal 165 include a wait on a multiply-divide unit to complete an operation (i.e., wait on arithmetic operation), or a synchronization instruction that suspends a thread until a synchronization event is complete (i.e., instruction synchronization).

Figure 2:
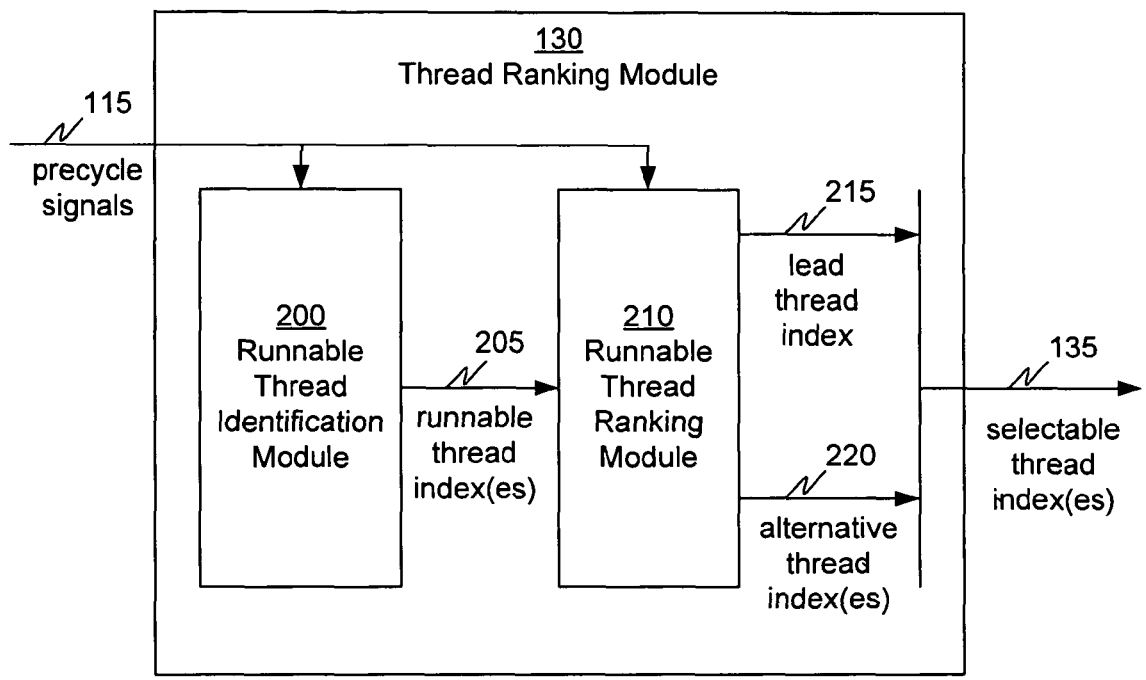
FIG. 2 is a block diagram of a thread ranking module, in accordance with one embodiment of the present invention.

Referring now to FIG. 2, an exemplary embodiment of the thread ranking module 130 is shown. The thread ranking module 130 includes a runnable thread identification module 200 and a runnable thread ranking module 210. The runnable thread identification module 200 identifies runnable threads and generates runnable thread index(es) 205, based on the precycle signals 115. The runnable thread ranking module 210 ranks the runnable thread index(es) 205, based on the precycle signals 115, to generate the selectable thread index(es) 135, as is described more fully herein.

In one embodiment, the runnable thread identification module 200 identifies the runnable threads based on the thread states 150 (FIG. 1). In this embodiment, the runnable thread identification module 200 identifies those threads that are in a runnable state at the start of a scheduling cycle established by the clock signal 160 (FIG. 1). As such, the runnable thread identification module 200 generates the runnable thread index(es) 205, which are the thread indexes 155 (FIG. 1) of the identified runnable threads.

In one embodiment, the runnable thread ranking module 210 groups the runnable thread index(es) 205 into priority groups based on the thread priorities 110 (FIG. 1), and then ranks the runnable thread index(es) 205 within each priority group based on a ranking algorithm to generate the selectable thread index(es) 135. For example, the ranking algorithm can establish an order for any runnable thread index(es) 205 within each priority group according to a fixed priority of the runnable thread index(es) 205 or a round robin ranking of the runnable thread index(es) 205. As another example, the ranking algorithm can establish an order for any runnable thread index(es) 205 within each priority group according to a weighted priority of the runnable thread index(es) 205 based on one or more characteristics of the threads (e.g., system state signals 102). It is to be appreciated that the ranking algorithm can be any ranking algorithm known to those skilled in art.

In this embodiment, each priority group has a priority that is the same as a thread priority 110 of a runnable thread having a runnable thread index 205 in the priority group. By grouping the runnable thread index(es) 205 into priority groups and ranking the runnable thread index(es) 205 within each priority group, the runnable thread ranking module 210 establishes an order for the runnable thread index(es) 205. As such, the selectable thread index(es) 135 are the ordered runnable thread index(es) 205.

Further, in this embodiment, the runnable thread ranking module 210 identifies the priority group having the highest priority as the highest priority group, and the runnable thread index 205 ranked highest within the highest priority group as a lead thread index 215. Additionally, the runnable thread ranking module 210 identifies the runnable thread index(es) 205 other than the lead thread index 215 as alternative thread index(es) 220. In this embodiment, the lead thread index 215 and the alternative thread index(es) 220 are the selectable thread index(es) 135, and the lead thread index 215 is the highest ranked selectable thread index 135.

In a further embodiment, the runnable thread ranking module 210 identifies the highest priority group that includes at least one runnable thread index 205 other than the lead thread index 215. In this embodiment, the runnable thread ranking module 210 identifies the highest ranked runnable thread index 205 in this highest priority group, other than the lead thread index 215, as the highest ranked alternative thread index 220.

In one embodiment, the runnable thread ranking module 210 uses a predetermined circular sequence of the thread indexes 155 (FIG. 1) to rank the runnable thread index(es) 205 within each priority group based on the ranking algorithm. The predetermined circular sequence provides a ranking order for the thread indexes 155. In this embodiment, the runnable thread ranking module 210 uses the most recently selected thread index 125 (i.e., the currently selected thread index 125) to select the next thread index 155 in the predetermined circular sequence that is to be ranked.

For example, the predetermined circular sequence can include the thread indexes 155 (FIG. 1) represented by the numerals "000", "001", "010", "011", and "100." In this example, the thread indexes 155 in the predetermined circular sequence are ordered in numerical sequence with the first thread index 155 (i.e., "000") following the last thread index 155 (i.e., "100"). Accordingly, the sequence of thread indexes 155 in the predetermined circular sequence is circular.

Further, in this example, the most recently selected thread index 125 (FIG. 1) is represented by the numeral "010", and the thread indexes 155 represented by the numerals "000" and "100" are runnable thread indexes 205 in the highest priority group. In this example, the runnable thread ranking module 210 identifies the highest priority group containing a runnable thread index 205 (e.g., "000" or "100"). The thread ranking module 210 then identifies the thread index 155 (FIG. 1) represented by the numeral "100" as the lead thread index 215 because this thread index 155 is the runnable thread index 205 in the highest priority group that first follows the most recently selected thread index 125 (i.e., "010") in the predetermined circular sequence.

Additionally, in this example, the runnable thread ranking module 210 identifies the same priority group as the highest priority group containing at least one alternative thread index 155. The runnable thread ranking module 210 then identifies the thread index 155 represented by the numeral "000" as the highest ranked alternative thread index 220 because this thread index 155 is the runnable thread index 205 in the highest priority group other than the lead thread index 215 that next follows the most recently selected thread index 125 (i.e., "010") in the predetermined circular sequence. In this example, the runnable thread ranking module 210 does not select the thread index 115 represented by the numeral "011" because this thread index 115 is either unrunnable or is in another priority group. Further, in this example, the runnable thread ranking module 210 repeats this ranking process until each runnable thread index 205 in the highest priority group is ranked. In a further embodiment, the runnable thread ranking module 210 repeats this ranking process for any remaining priority groups in order of priority.

As another example, the predetermined circular sequence can include the thread indexes 155 (FIG. 1) represented by the numerals "000", "001", "010", "011", and "100." In this example, the most recently selected thread index 125 (FIG. 1) is represented by the numeral "010", the thread index 115 represented by the numeral "011" is not a runnable thread index 205, the thread index 115 represented by the number "000" is a runnable thread index 205 is the highest priority group, and the thread indexes 115 represented by the numerals "100" and "001" are runnable thread indexes 205 in a second highest priority group (i.e., a lower priority group). In this example, the runnable thread ranking module 210 identifies the thread index 155 (FIG. 1) represented by the numeral "000" as the lead thread index 215 because this thread index 155 is the runnable thread index 205 in the highest priority group that first follows the most recently selected thread index 125 (i.e., "010") in the predetermined circular sequence.

Additionally, in this example, the runnable thread ranking module 210 identifies a highest ranked priority group containing at least one alternative thread index 155. The runnable thread ranking module 210 then identifies the thread index 155 represented by the numeral "100" as the highest ranked alternative thread index 220 within this highest priority group because this thread index 155 is the runnable thread index 205 within this highest priority group other than the lead thread index 215 that next follows the most recently selected thread index 125 (i.e., "010") in the predetermined circular sequence. In this example, the runnable thread ranking module 210 does not select the thread index 115 represented by the numeral "011" because this thread index 115 is unrunnable. Further, in this example, the runnable thread ranking module 210 repeats the ranking process until each runnable thread index 205 in this highest priority group is ranked, and repeats this ranking process for any remaining priority groups in order of group priority.

In an alternative embodiment, the ranking algorithm is a round robin algorithm. In this embodiment, the runnable thread ranking module 210 ranks the runnable thread index(es) 205 according to the priority groups and ranks the runnable thread index(es) 205 within each priority group based on the predetermined circular sequence. In this alternative embodiment, however, the runnable thread ranking module 210 stores the most recently selected thread index 125 from each priority group and ranks the thread index(es) 155 within each priority group based on the most recently selected thread index 125 for that priority group instead of the currently selected thread index 125.

Figure 3:
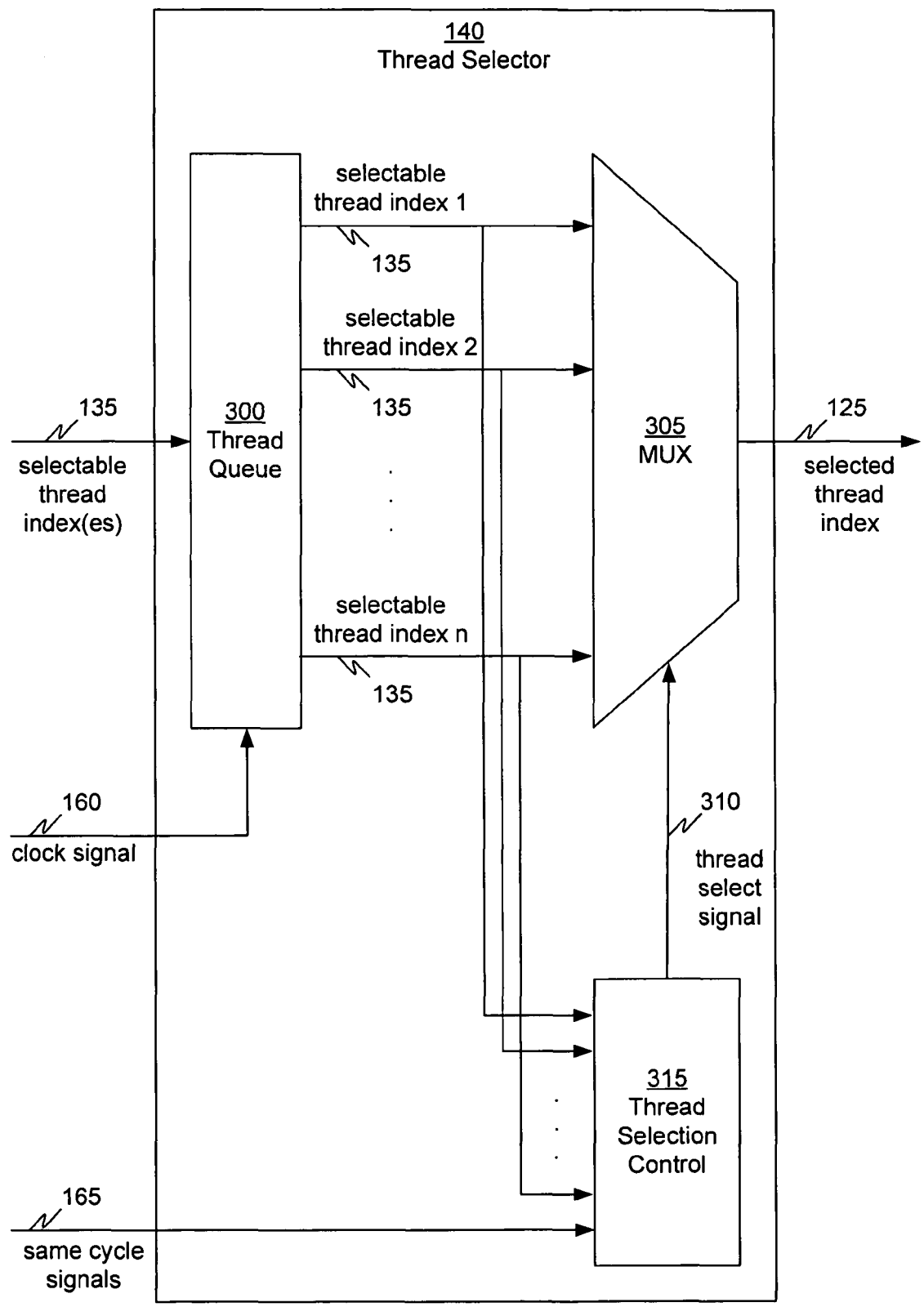
FIG. 3 is a block diagram of a thread selector, in accordance with one embodiment of the present invention.

Referring now to FIG. 3, an exemplary thread selector 140 is shown. The thread selector 140 includes a thread queue 300, a multiplexer (MUX) 305, and a thread selection control 315. The thread queue 300 receives the selectable thread index(es) 135 from the thread ranking module 130 (FIG. 1) and the clock signal 160 (FIG. 1), and stores the selectable thread index(es) 135 according to the ranking of the selectable thread index(es) 135 established by the thread ranking module 130. In one embodiment, the thread queue 300 stores the selectable thread index(es) 135 at the start of a scheduling cycle established by the clock signal 160 (e.g., a rising edge of the clock signal 160). Additionally, the thread queue 300 outputs the selectable thread index(es) 135 to the multiplexer 305 and the thread selection control 315.

In another embodiment, the thread queue 300 can store a predetermined number of selectable thread index(es) 135. In this embodiment, the thread queue 300 receives the highest ranked selectable thread index(es) 135 from the thread ranking module 130 (FIG. 1) up to the predetermined number, and stores the highest ranked selectable thread index(es) 135. In one further embodiment, the thread queue 300 can store a selectable thread index 135 for each thread in the computing environment 100. In this embodiment, the predetermined number of selectable thread indexes 135 that the thread queue 300 can store is equal to the number of threads (e.g., hardware threads) in the computing environment 100. In another further embodiment, the thread queue 300 can store a selectable thread index 135 for each thread being processed by the pipelined processor 170. In this embodiment, the predetermined number of selectable thread indexes 135 that the thread queue 300 can store is equal to a predetermined number of stages in the pipelined processor 170.

The multiplexer 305 passes one of the selectable thread index(es) 135 stored in the thread queue 300 as the selected thread index 125, based on a thread select signal 310. The thread selection control 315 generates the thread select signal 310 based on the selectable thread index(es) 135 received from the thread queue 300 and the same cycle signal(s) 165. The same cycle signal(s) 165 indicate whether a selectable thread index 135 will be runnable in the next scheduling cycle, as is described more fully herein. The thread selection control 315 generates the thread select signal 310 so that the multiplexer 305 will pass the highest ranked selectable thread index 135 of the thread that will be runnable in the next scheduling cycle as the selected thread index 125.

Figure 4:
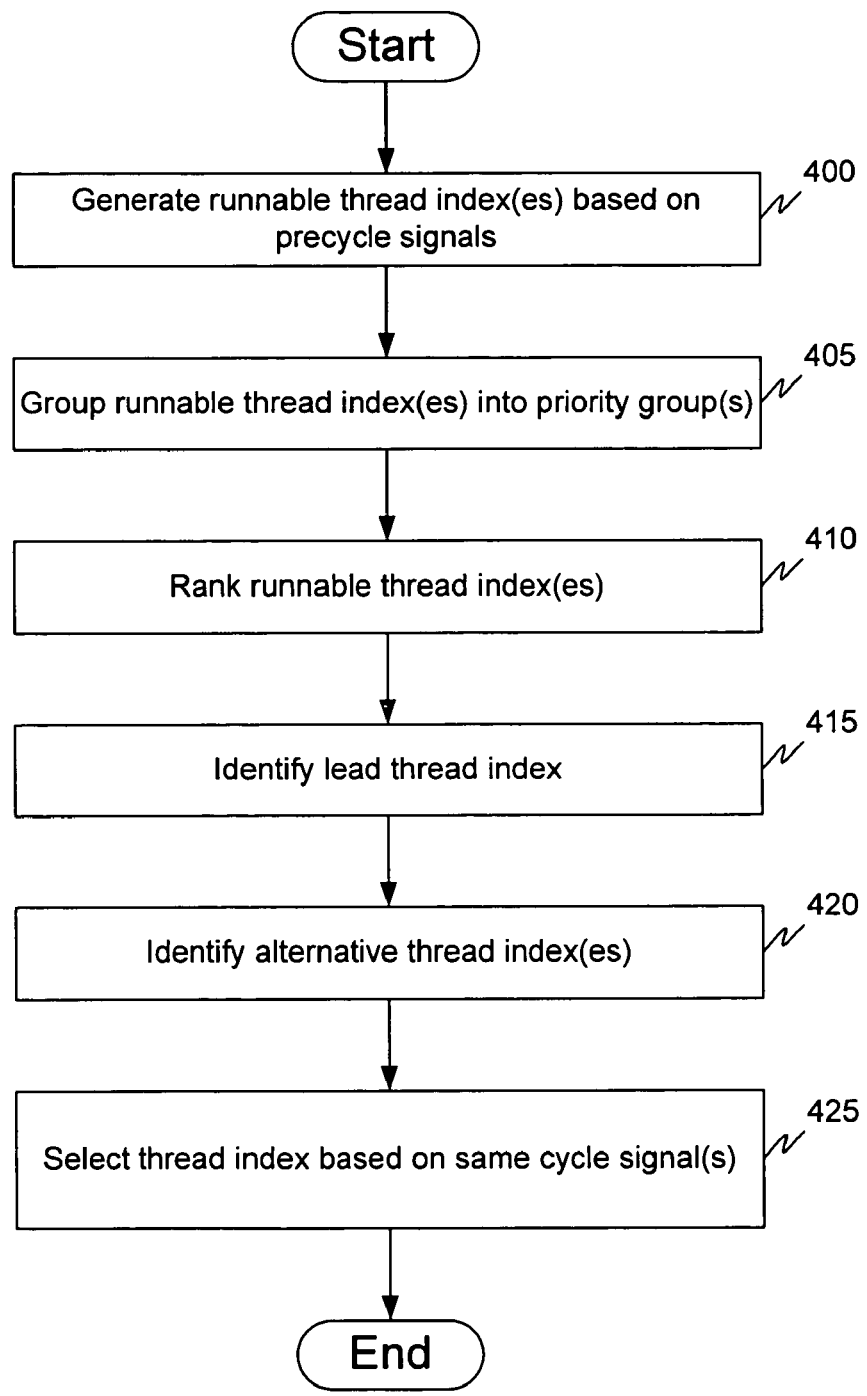
FIG. 4 is a flow chart for a method of scheduling a thread, in accordance with one embodiment of the present invention.

Referring now to FIG. 4, a flow chart of a method for scheduling a thread, in accordance with the present invention, is shown. In step 400, the runnable thread identification module 200 (FIG. 2) identifies one or more runnable threads and generates the runnable thread index(es) 205 based on the precycle signals 115. In one embodiment, the runnable thread identification module 200 identifies any runnable threads based on the thread states 150 (FIG. 1) of the threads at the start of a scheduling cycle established by the clock signal 160, as is described more fully herein.

In step 405, the runnable thread ranking module 210 (FIG. 2) groups the runnable thread index(es) 205 of any identified runnable thread(s) into priority group(s). In one embodiment, each priority group has a priority that is the same as a thread priority 110 of a runnable thread having a runnable thread index 205 in the priority group.

In step 410, the runnable thread ranking module 210 (FIG. 2) ranks the runnable thread index(es) 205, based on one or more precycle signals 115 and a ranking algorithm, to generate the selectable thread index(es) 135. In one embodiment, the runnable thread ranking module 210 ranks the runnable thread index(es) 205 according to the priority groups such that any runnable thread index 205 in a higher priority group is ranked higher than any runnable thread index 205 is a lower priority group. In this embodiment, the runnable thread ranking module 210 also ranks the runnable thread index(es) 205 within each priority group, based on the ranking algorithm. In another embodiment, the runnable thread ranking module 210 uses a predetermined circular sequence of the thread indexes 155 (FIG. 1) to rank the runnable thread index(es) 205 within the priority groups based on the ranking algorithm, as is described more fully herein. In a further embodiment, the ranking algorithm is a round robin algorithm. In this further embodiment, the runnable thread ranking module 210 ranks the runnable thread index(es) 205 within each priority group based on a round robin ranking order, as is described more fully herein.

In step 415, the runnable thread ranking module 210 (FIG. 2) identifies a runnable thread index 205 in the highest priority group as the lead thread index 215. In one embodiment, the runnable thread ranking module 210 first identifies the priority group having the highest priority as the highest priority group, as is described more fully herein. In this embodiment, the lead thread index 215 is the runnable thread index 205 in the highest priority group that is ranked highest within the priority group based on the ranking algorithm. In a further embodiment, the lead thread index 215 is the runnable thread index 205 in the highest priority group that first follows a most recently selected thread index 125 in a predetermined circular sequence, as is described more fully herein.

In step 420, the runnable thread ranking module 210 (FIG. 2) identifies any runnable thread index(es) 205 other than the lead thread index 215 as alternative thread index(es) 220. In one embodiment, the runnable thread ranking module 210 identifies a highest priority group containing at least one alternative thread index 220. In this embodiment, the runnable thread ranking module 210 ranks any alternative thread index(es) 220 in this highest priority group, based on a ranking algorithm (e.g., a round robin algorithm). Additionally, the runnable thread ranking module 210 identifies one alternative thread index 220 in this highest priority group as the highest ranked alternative thread index 220, based on the ranking algorithm. In a further embodiment, the highest ranked alternative thread index 220 is the runnable thread index 205 in this highest priority group other than the lead thread index 215 that first follows a most recently selected thread index 125 in the predetermined circular sequence, as is described more fully herein.

In step 425, the thread selector 140 (FIG. 1) selects as the selected thread index 125 the highest ranked selectable thread index 135 of the thread that will be runnable in the next scheduling cycle, based on the same cycle signal(s) 165. In one embodiment, the thread selection control 315 (FIG. 3) of the thread selector 140 generates a thread select signal 310 based on the same cycle signal(s) 165, and the multiplexer 305 passes one of the selectable thread index(es) 135 stored in the thread queue 300 as the selected thread index 125 based on the thread select signal 310, as is described more fully herein.

Figure 5:
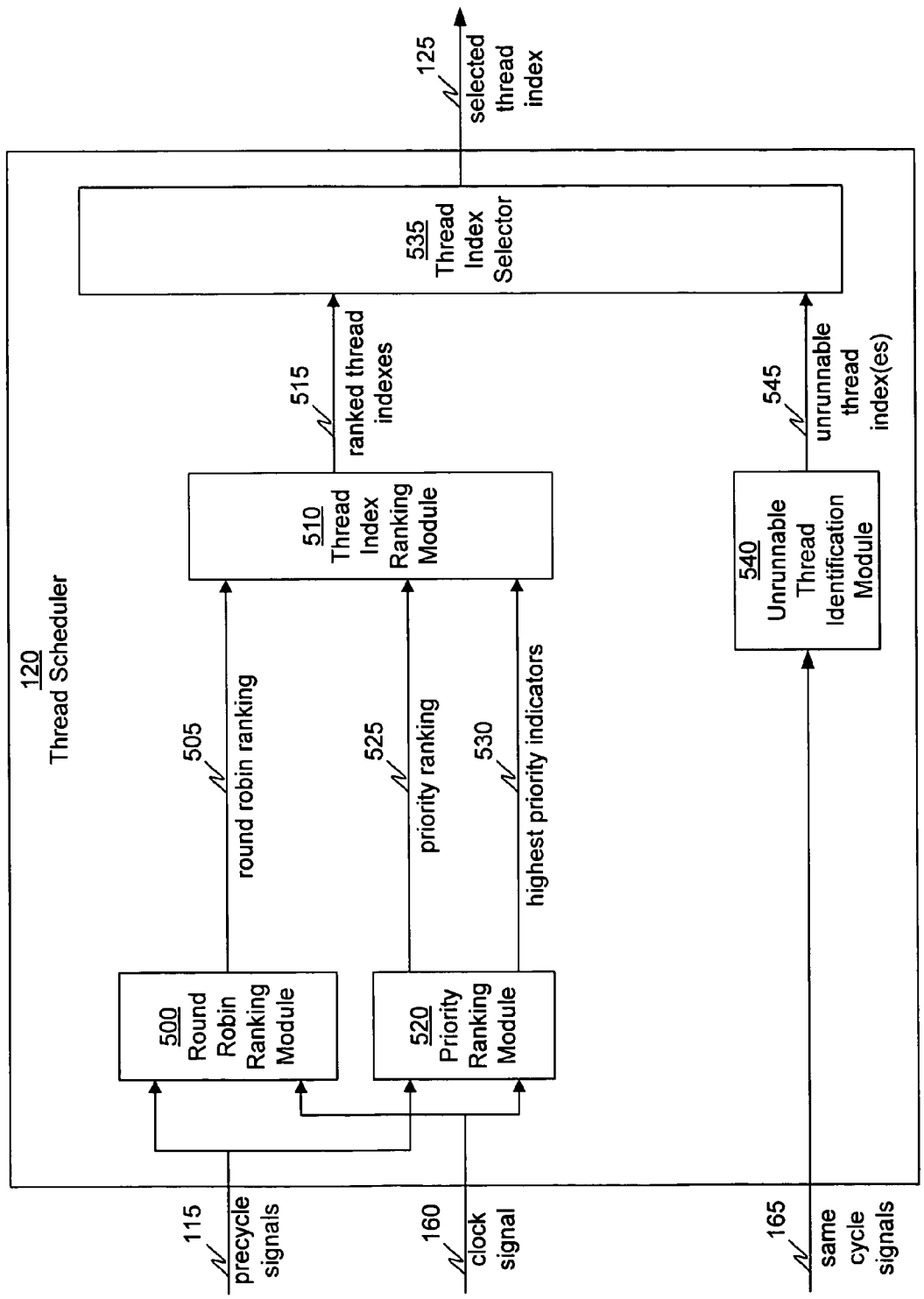
FIG. 5 is block diagram of the thread scheduler, in accordance with another embodiment of the present invention.

Referring now to FIG. 5, the thread scheduler 120 is shown, in accordance with another embodiment of the present invention. In this embodiment, the thread scheduler 120 includes a round robin ranking module 500, a thread index ranking module 510, a priority ranking module 520, a thread index selector 535, and an unrunnable thread identification module 540.

The round robin ranking module 500 ranks the thread indexes 155 (FIG. 1) based on at least one precycle signal 115 according to a round robin ranking algorithm to determine a round robin ranking 505 for the thread indexes 155. Further, the round robin ranking module 500 provides the round robin ranking 505 to the thread index ranking module 510.

In one embodiment, the round robin ranking module 500 includes a circular queue (not shown) containing the thread indexes 155 arranged in numerical sequence. In this embodiment, the precycle signals 115 include the most recently selected thread index 125. Further, the round robin ranking module 500 ranks the thread indexes 155 according to the order of the thread indexes 155 in the circular queue such that the most recently selected thread index 125 is ranked lowest in the round robin ranking 505. In another embodiment, the round robin ranking module 500 determines the round robin ranking 505 during a first clock cycle (e.g., a scheduling cycle) of the clock signal 160 based on the most recently selected thread index 125. In a further embodiment, the most recently selected thread index is determined before the start of a second clock cycle (e.g., a scheduling cycle) following the first clock cycle.

The priority ranking module 520 ranks the thread indexes 155 based on at least one of the precycle signals 115 to determine a priority ranking 525 of the thread indexes 155. Additionally, the priority ranking module 520 generates a highest priority indicator 530 for each thread index 155 which indicates whether the thread of the thread index 155 has a highest thread priority 110. The priority ranking module 520 provides the priority ranking 525 and the highest priority indicators 530 to the thread index ranking module 510.

In one embodiment, the thread index 155 of each thread having a higher thread priority 110 than another thread is ranked higher than the thread index 155 of the other thread in the priority ranking 525. In a further embodiment, the thread indexes 155 of threads having the same thread priority 110 are further ranked according to the thread indexes 155 such that a higher thread index 155 is ranked higher than a lower thread index 155.

In another embodiment, the priority ranking module 520 determines the priority ranking 525 during the first clock cycle based on the thread priorities 110. In a further embodiment, the thread priorities. 110 are determined before the start of the second clock cycle.

The thread index ranking module 510 ranks the thread indexes 155 based on the round robin ranking 505, the priority ranking 525, and the highest priority thread indicators 530 to generate the ranked thread indexes 515. In one embodiment, the thread index ranking module 510 identifies any thread index 155 having the highest thread priority 110 based on the highest priority indicators 530 and ranks the thread indexes 155 having the highest thread priority 110 according to the round robin ranking 505 as the highest ranked thread indexes 515. Further, in this embodiment, the thread index ranking module 510 ranks the remaining thread indexes 155 (i.e., any thread index 155 of a thread not having the highest thread priority 110) according to the priority ranking 525. In this way, the thread index(es) 155 having the highest thread priority 110 are ranked as the highest ranked thread index(es) 515 according to the round robin ranking 505 and the remaining thread index(es) 155 are ranked as lower ranked thread index(es) 515 according to the priority ranking 525.

In one embodiment, the thread index ranking module 510 determines the ranked thread indexes 515 during a second clock cycle (e.g., a scheduling cycle) following a first clock cycle. In this embodiment, the round robin ranking module 500 determines the round robin ranking 505 before the start of the second clock cycle and the priority ranking module 520 determines the priority ranking 525 before the start of the second clock cycle.

The unrunnable thread identification module 540 identifies the thread index 115 of any unrunnable thread as an unrunnable thread index 545 based on at least one same cycle signal 165 and provides the unrunnable thread index(es) 545 to the thread index selector 535. In one embodiment, the unrunnable thread identification module 540 determines whether any thread is unrunnable during the second clock cycle based on at least one same cycle signal 165 and outputs the thread index 155 of the unrunnable thread as one of the unrunnable thread index(es) 545 during the second clock cycle. For example, the same cycle signals 165 can include a data cache miss, an instruction cache miss, an instruction exception, a wait on arithmetic operation, or an instruction synchronization, which may occur during the second clock cycle.

The thread index selector 535 selects the highest ranked thread index 515 that is not an unrunnable thread index 545 and outputs the selected ranked thread index 515 as the selected thread index 125. Stated differently, the thread index selector 535 selects the highest ranked thread index 515 of a runnable thread and outputs the selected ranked thread index 515 as the selected thread index 125. In one embodiment, the thread index selector 535 outputs the selected thread index 125 during the second clock cycle.

Figure 6:
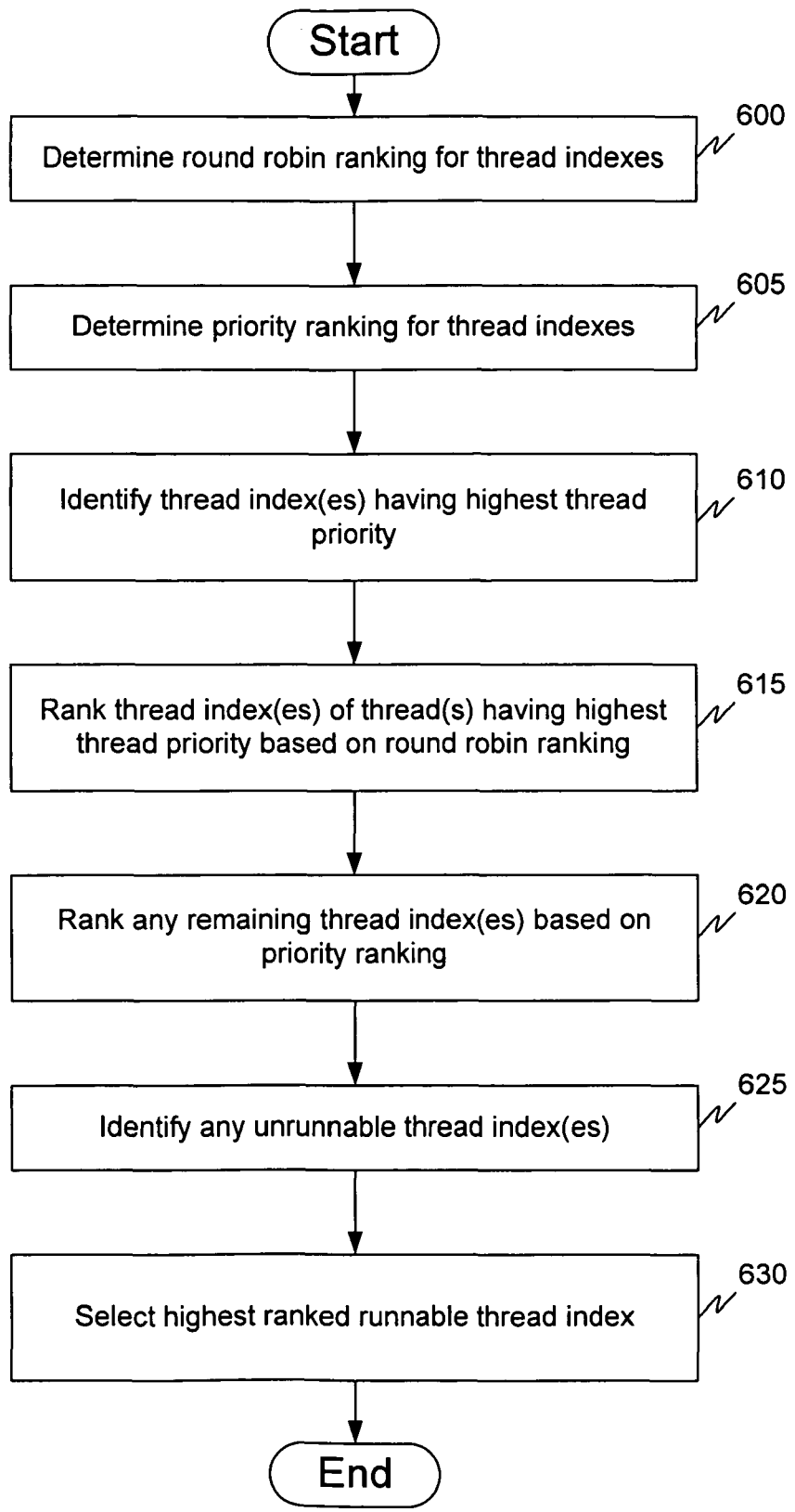
FIG. 6 is a flow chart for a method of scheduling a thread, in accordance with another embodiment of the present invention.

Referring now to FIG. 6, a flow chart for a method of scheduling a thread is shown, in accordance with another embodiment of the present invention. In step 600, the round robin ranking module 500 (FIG. 5) determines the round robin ranking 505 (FIG. 5) for the thread indexes 155 (FIG. 1) based on at least one precycle signal 115 (FIG. 5). In one embodiment, the round robin ranking module 500 determines the round robin ranking 505 during a first clock cycle (e.g., a scheduling cycle) of the clock signal 160 (FIG. 5) based on the most recently selected thread index 125 (FIG. 5). In this embodiment, the round robin ranking module 500 ranks the thread indexes 155 in numerical sequence such that the most recently selected thread index 125 is ranked lowest in the round robin ranking 505.

In step 605, the priority ranking module 520 (FIG. 5) determines a priority ranking 525 (FIG. 5) for the thread indexes 155 based on one or more precycle signals 115 and provides the priority ranking 525 to the thread index ranking module 510 (FIG. 5). In one embodiment, the priority ranking module 520 determines the priority ranking 525 according to the thread priorities 110 (FIG. 1) of the thread indexes 155. In this embodiment, the thread index 155 of each thread having a higher thread priority 110 than another thread is ranked higher than the thread index 155 of the other thread in the priority ranking 525.

In step 610, the priority ranking module 520 identifies each thread index 155 having the highest thread priority 110. Further, the priority ranking module 520 generates a highest priority indicator 530 (FIG. 5) for each thread index 155, which indicates whether the thread index 155 has the highest thread priority 110. The priority ranking module 520 provides the highest priority indicators 530 to the thread index ranking module 510.

In step 615, the thread index ranking module 510 ranks the thread indexes 155 having the highest thread priority 110 based on the round robin ranking 505 to generate the ranked thread indexes 515 (FIG. 5). In one embodiment, the thread index ranking module 510 identifies the thread index(es) 155 of threads having the highest thread priority 110 based on the highest priority indicators 530 and ranks the identified thread index(es) 155 according to the round robin ranking 505 to generate the highest ranked thread index(es) 515. In a further embodiment, the thread index ranking module 510 generates the highest ranked thread indexes 515 during a second clock cycle (e.g., a scheduling cycle) of the clock signal 160 that follows the first clock cycle.

In step 620, the thread index ranking module 510 ranks any remaining thread index(es) 155 (i.e., any thread index 155 of a thread not having the highest thread priority 110) based on the priority ranking 525 to generate the remaining ranked thread index(es) 515 (i.e., the lower ranked thread index(es) 515). In a further embodiment, the thread index ranking module 510 generates the remaining thread index(es) 515 during the second clock cycle.

In step 625, the unrunnable thread identification module 540 identifies any unrunnable thread index(es) 545 based on at least one same cycle signal 165 and provides the unrunnable thread index(es) 545 to the thread index selector 535. In one embodiment, the unrunnable thread identification module 540 identifies any unrunnable thread based on the same cycle signals 165 and identifies the thread index 155 of each unrunnable thread as an unrunnable thread index 545. In another embodiment, the unrunnable thread identification module 540 identifies the unrunnable thread index(es) 545 during the second clock cycle.

In step 630, the thread index selector 535 selects the highest ranked thread index 515 that is not an unrunnable thread index 545 (i.e., the highest ranked thread index 515 of a runnable thread) and outputs the selected ranked thread index 515 as the selected thread index 125. In one embodiment, the thread index selector 535 outputs the selected thread index 125 during the second clock cycle.

It is to be appreciated that steps 600-630 can be performed in a different order than the order described hereinabove in various embodiments. It is also to be appreciated that one or more of the steps 600-630 can be performed substantially simultaneously. For example, steps 600, 605 and 610 can be performed substantially simultaneously in various embodiments. As another example, steps 615 and 620 can be performed substantially simultaneously in various embodiments.

The embodiments discussed herein are illustrative of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method of scheduling a thread of a plurality of threads in a thread scheduler, each thread of the plurality of threads having a thread index and a thread priority, the method comprising:

identifying in a runnable thread identification module of the thread scheduler a plurality of runnable threads from the plurality of threads, wherein the runnable threads are those threads that are runnable at the start of a scheduling cycle and generating in the runnable thread identification module of the thread scheduler a plurality of runnable thread indexes, wherein the runnable thread indexes are the thread indexes of the identified runnable threads, and wherein the scheduling cycle is a clock cycle of a clock signal and the start of the scheduling cycle is established by an edge of the clock signal;

determining in a priority ranking module of the thread scheduler a priority ranking for the runnable thread indexes according to the thread priorities;

determining in a round robin ranking module of the thread scheduler a round robin ranking for the runnable thread indexes;

ranking in a thread index ranking module of the thread scheduler the runnable thread indexes based on the priority ranking and the round robin ranking, the ranked runnable thread indexes having the highest priority being ranked according to the round robin ranking and the remaining runnable thread indexes being ranked according to the priority ranking;

identifying in an unrunnable thread identification module of the thread scheduler the thread index of any unrunnable thread as an unrunnable thread index based on at least one same cycle signal received for a runnable thread after the start of the scheduling cycle, the same cycle signal indicating that the runnable thread has become unrunnable during the scheduling cycle, wherein the same cycle signal indicates a data cache miss or an instruction cache miss or an instruction exception or a wait on arithmetic operation or an instruction synchronization; and selecting in a thread index selector of the thread scheduler the highest ranked thread index that is not an unrunnable thread index based on any thread index identified as an unrunnable thread index by the unrunnable thread identification module.

2. The method of claim 1, wherein determining the round robin ranking for the runnable thread indexes further comprises:

identifying any thread index having the highest priority based on the thread priorities; and ranking each identified runnable thread index according to a round robin ranking algorithm.

3. The method of claim 1, wherein:

determining the priority ranking for the runnable thread indexes according to the thread priorities is performed during a first clock cycle;

determining the round robin ranking for the runnable thread indexes is performed during the first clock cycle; and ranking the runnable thread indexes based on the priority ranking and the round robin ranking is performed during a second clock cycle, the second clock cycle following the first clock cycle.

4. The method of claim 3, wherein determining the round robin ranking for the runnable thread indexes is based on a most recently selected thread index.

5. The method of claim 3, wherein determining the priority ranking for the runnable thread indexes according to the thread priorities is based on at least one precycle signal determined before the start of the second clock cycle.

6. The method of claim 5, wherein the at least one precycle signal comprises the thread priority of each runnable thread index.

7. The method of claim 3, wherein identifying the thread index of any unrunnable thread as an unrunnable thread index is performed based on at least one same cycle signal determined after the start of the second clock cycle.

8. A thread scheduler for scheduling a thread of a plurality of threads, each thread of the plurality of threads having a thread index and a thread priority, the thread scheduler comprising:

a runnable thread identification module configured to identify plurality of runnable threads from the plurality of threads, wherein the runnable threads are those threads that are runnable at the start of a scheduling cycle and to generate a plurality of runnable thread indexes, wherein the runnable thread indexes are the thread indexes of the identified runnable threads, and wherein the scheduling cycle is a clock cycle of a clock signal and the start of the scheduling cycle is established by an edge of the clock signal;

a priority ranking module configured to determine a priority ranking for the runnable thread indexes according to the thread priorities;

a round robin ranking module configured to determine a round robin ranking for the runnable thread indexes;

a thread index ranking module configured to rank the runnable thread indexes based on the priority ranking and the round robin ranking, the ranked runnable thread indexes having the highest priority being ranked according to the round robin ranking and the remaining runnable thread indexes being ranked according to the priority ranking; and an unrunnable thread identification module configured to identify the thread index of any unrunnable thread as an unrunnable thread index based on at least one same cycle signal received for a runnable thread during the scheduling cycle, the same cycle signal indicating that the runnable thread has become unrunnable during the scheduling cycle, wherein the same cycle signal indicates a cache miss or an instruction exception or a wait on arithmetic operation or an instruction synchronization; and a thread index selector configured to select the highest ranked thread index that is not an unrunnable thread index based on any thread index identified as an unrunnable thread index by the unrunnable thread identification module, the thread index selector further configured to output the selected thread index.

9. The thread scheduler of claim 8, wherein the round robin ranking module is further configured to identify any runnable thread index having the highest thread priority based on the thread priorities and to rank each identified runnable thread index according to a round robin ranking algorithm.

10. The thread scheduler of claim 8, wherein:
the priority ranking module is further configured to determine the priority ranking for the runnable thread indexes during a first clock cycle;
the round robin ranking module is further configured to determine the round robin ranking during the first clock cycle; and
the thread index ranking module is further configured to rank the runnable thread indexes during a second clock cycle, the second clock cycle following the first clock cycle.

11. The thread scheduler of claim 10, wherein the round robin ranking module is further configured to determine the round robin ranking based on a most recently selected thread index.

12. The thread scheduler of claim 10, wherein the priority ranking module is further configured to determine the priority ranking for the runnable thread indexes based on at least one precycle signal determined before the start of the second clock cycle.

13. The thread scheduler of claim 12, wherein the at least one precycle signal comprises the thread priority of each runnable thread index.

14. The thread scheduler of claim 10, wherein the unrunnable thread identification module is further configured to identify any unrunnable thread index based on at least one same cycle signal determined after the start of the second clock cycle.

15. A computer system for scheduling a thread of a plurality of threads, each thread of the plurality of threads having a thread index and a thread priority, the system comprising:
means for identifying a plurality of runnable threads from the plurality of threads, wherein the runnable threads are those threads that are runnable at the start of a scheduling cycle, wherein the scheduling cycle is a clock cycle of a clock signal and the start of the scheduling cycle is established by an edge of the clock signal;
means for generating a plurality of runnable thread indexes, wherein the runnable thread indexes are the thread indexes of the identified runnable threads;
means for determining a priority ranking for the runnable thread indexes according to the thread priorities;
means for determining a round robin ranking for the runnable thread indexes;
means for ranking the runnable thread indexes based on the priority ranking and the round robin ranking, the ranked runnable thread indexes having the highest priority being ranked according to the round robin ranking and the remaining runnable thread indexes being ranked according to the priority ranking;
means for identifying the thread index of any unrunnable thread as an unrunnable thread index based on at least one same cycle signal received for a runnable thread during the scheduling cycle, the same cycle signal indicating that the runnable thread has become unrunnable during the scheduling cycle, wherein the same cycle signal indicates a cache miss or an instruction exception or a wait on arithmetic operation or an instruction synchronization; and
means for selecting the highest ranked thread index that is not an unrunnable thread index based on any thread index identified as an unrunnable thread index by the means for identifying the thread index of any unrunnable thread as an unrunnable thread index.

16. A memory storage device including computer program code when executed by a processor for performing a method of scheduling a thread of a plurality of threads, each thread of the plurality of threads having a thread index and a thread priority, the method comprising:
identifying a plurality of runnable threads from the plurality of threads, wherein the runnable threads are those threads that are runnable at the start of a scheduling cycle, wherein the scheduling cycle is a clock cycle of a clock signal and the start of the scheduling cycle is established by an edge of the clock signal;
generating a plurality of runnable thread indexes, wherein the runnable thread indexes are the thread indexes of the identified runnable threads;
determining a priority ranking for the runnable thread indexes according to the thread priorities;
determining a round robin ranking for the runnable thread indexes;
ranking the runnable thread indexes based on the priority ranking and the round robin ranking, the ranked runnable thread indexes having the highest priority being ranked according to the round robin ranking and the remaining runnable thread indexes being ranked according to the priority ranking;
identifying the thread index of any unrunnable thread as an unrunnable thread index based on at least one same cycle signal received for a runnable thread during the scheduling cycle, the same cycle signal indicating that the runnable thread has become unrunnable during the scheduling cycle, wherein the same cycle signal indicates a cache miss or an instruction exception or a wait on arithmetic operation or an instruction synchronization; and
selecting the highest ranked thread index that is not an unrunnable thread index based on any thread index identified as an unrunnable thread index.

17. The memory storage device of claim 16, wherein:
determining the priority ranking for the runnable thread indexes according to the thread priorities is performed during a first clock cycle;
determining the round robin ranking for the runnable thread indexes is performed during the first clock cycle; and
ranking the runnable thread indexes based on the priority ranking and the round robin ranking is performed during a second clock cycle, the second clock cycle following the first clock cycle.

18. The memory storage device of claim 17, wherein:
determining the priority ranking for the runnable thread indexes according to the thread priorities is based on at least one precycle signal determined before the start of the second clock cycle;
determining the round robin ranking for the runnable thread indexes is based on a most recently selected thread index; and
identifying the thread index of any unrunnable thread as an unrunnable thread index is performed based on at least one same cycle signal determined after the start of the second clock cycle.

* * * * *